US010075054B1

(12) United States Patent
Tsai

(10) Patent No.: US 10,075,054 B1
(45) Date of Patent: Sep. 11, 2018

(54) POWER SUPPLY CAPABLE OF MAINTAINING ITS OUTPUT VOLTAGE

(71) Applicant: Chicony Power Technology Co., Ltd., New Taipei (TW)

(72) Inventor: Hsien-Yi Tsai, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 15/682,953

(22) Filed: Aug. 22, 2017

(30) Foreign Application Priority Data

May 26, 2017 (TW) .............................. 106117631 A

(51) Int. Cl.
*H02M 3/335* (2006.01)
*H02M 1/00* (2006.01)
*H02M 3/24* (2006.01)
*H02M 7/217* (2006.01)

(52) U.S. Cl.
CPC ............... *H02M 1/00* (2013.01); *H02M 3/24* (2013.01); *H02M 7/217* (2013.01); *H02M 3/33507* (2013.01); *H02M 2001/0003* (2013.01)

(58) Field of Classification Search
CPC .......... H02M 7/217; H02M 7/21; H02M 7/12; H02M 7/043; H02M 7/06; H02M 7/2176; H02M 7/25; H02M 7/23; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569

USPC ...................................................... 363/15–17
See application file for complete search history.

(56) References Cited

U.S. PATENT DOCUMENTS

| 4,902,942 | A  | * | 2/1990 | El-Hamamsy | H01F 29/14 315/276 |
| 7,274,116 | B2 | * | 9/2007 | Inoue | H02J 7/0065 307/100 |
| 9,729,055 | B1 | * | 8/2017 | Yao | H02M 3/158 |
| 2008/0175025 | A1 | * | 7/2008 | Yoon | H02J 7/0065 363/15 |

* cited by examiner

*Primary Examiner* — Timothy J Dole
*Assistant Examiner* — Bryan R Perez
(74) *Attorney, Agent, or Firm* — Muncy, Geissler, Olds & Lowe, P.C.

(57) ABSTRACT

A power supply includes a DC to DC converter, a storage capacitor, a voltage detector, a bypass unit, and a voltage-multiplying unit. The DC to DC converter receives a capacitor voltage from the storage capacitor and generates an output voltage; the voltage detector is configured to detect an input voltage. The bypass unit electrically connected to the storage capacitor turns on when the input voltage is equal to or greater than the capacitor voltage and turns off when the input voltage is lower than the capacitor voltage. The voltage-multiplying unit electrically connected to the storage capacitor and the voltage detector includes a first winding and a second winding and performs a voltage-multiplying procedure by coupling the first winding to the second winding while the input voltage is lower than a threshold voltage to ensure that the DC to DC converter can generate the output voltage for a specific period.

7 Claims, 5 Drawing Sheets

POWER SUPPLY CAPABLE OF MAINTAINING ITS OUTPUT VOLTAGE

BACKGROUND

Technical Field

The present disclosure relates to a power supply. More particularly, the present disclosure relates to a power supply capable of maintaining its output voltage as a predetermined level with a specific period after a drop-out of electric power supplied by pre-stage circuit.

Description of Related Art

Electronic devices are operated when providing with a suitable and normal electric power, thereby the electronic devices may be suffered when the electric power supplies abnormally. A "hold-up time" is required to be the time necessary to maintain voltage output after the electric power is failed to allow the electronic device to complete necessary file storage and control operations for a safe shut-down.

In general, the required energy to maintain the output voltage during the hold-up time is obtained from a bulk capacitor, wherein the size of the bulk capacitor is related to a storage capacity thereof. An approach for prolonging the hold-up time is to increase the storage capacity of the bulk capacitor and the size thereof is increased accordingly, so that the size of the power supply is bulky.

SUMMARY

The disclosure is provided to ensure that a direct current (DC) to DC converter can successfully maintain its output voltage for powering a load with a specific period after a drop-out of an input voltage or when the input voltage start to fall.

Accordingly, a power supply receives an input voltage and generates an output voltage for powering a load includes a storage capacitor, a DC to DC converter, a voltage detector, a bypass unit, and a voltage-multiplying unit. The storage capacitor has a capacitor voltage; the DC to DC converter receives the capacitor voltage from the storage capacitor and then generates the output voltage; the voltage detector is configured to detect the input voltage. The bypass unit includes a diode and a power switch; the diode electrically connected to the storage capacitor turns off when the input voltage is lower than the capacitor voltage; the power switch electrically connected to the diode in parallel is turned on when the input voltage is equal to or greater than the capacitor voltage and turned off when the input voltage is lower than the capacitor voltage. The input voltage is conducted to the storage capacitor when the power switch is turned on. The voltage-multiplying unit electrically connected to the storage capacitor and the voltage detector includes a first winding and a second winding, wherein a turns ratio of the second winding to the first winding is greater than one. The voltage-multiplying unit performs a voltage-multiplying procedure for charging the storage capacitor by coupling the first winding to the second winding while the input voltage is lower than a threshold voltage to ensure that the DC to DC converter can successfully generate the output voltage for a specific period.

This and other implementations can each optionally include one or more of the following features. The voltage-multiplying unit may include a switching element and a controller, the switching element is electrically connected to the first winding, and the controller is electrically connected to the voltage detector and the switching element. The controller may output a controlling signal to the switching element when the input voltage is lower than the threshold voltage, so that the input voltage is coupled to the second winding by the first winding for maintaining the capacitor voltage.

The power supply may further include a feedback unit electrically connected to the storage capacitor and the controller, and the feedback unit is configured to send a detecting result of the capacitor voltage when the threshold voltage is the capacitor voltage.

The power supply may further include a buffering circuit including a capacitor, a diode, and a resistor; the capacitor may be electrically connected to one terminal of the first winding, and the diode may be arranged between the other terminal of the first winding and the capacitor and serially connected thereto. The resistor is electrically connected to the capacitor in parallel. The bypass unit may further include a power switch controller electrically connected to the power switch; the bypass unit is configured to detect the input voltage and the capacitor voltage and drives the power switch to turn off when the input voltage is lower than the capacitor voltage.

In an embodiment of the present disclosure, the first winding the second winding separated from each other may collectively constitute an isolated transformer, the first winding receives the input voltage and the second winding is electrically connected to the DC to DC converter.

In an embodiment of the present disclosure, one terminal of the first winding may receive the input voltage and electrically connect to the second winding, and the other terminal thereof may be electrically connected to the switching element. The voltage-multiplying unit may further include a discharging switch disposed across the switching element, and the discharging switch may turn on when the switching element is turns off.

The power supply according to the present disclosure provides a voltage-multiplying function by the first winding and the second winding to ensure that the DC to DC converter can successfully maintain its output voltage for powering a load with the specific period after the drop-out of the input voltage or when the input voltage start to fall. Thereby the circuit stability has to be maintained without increasing storage capacity of the storage capacitor and size.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
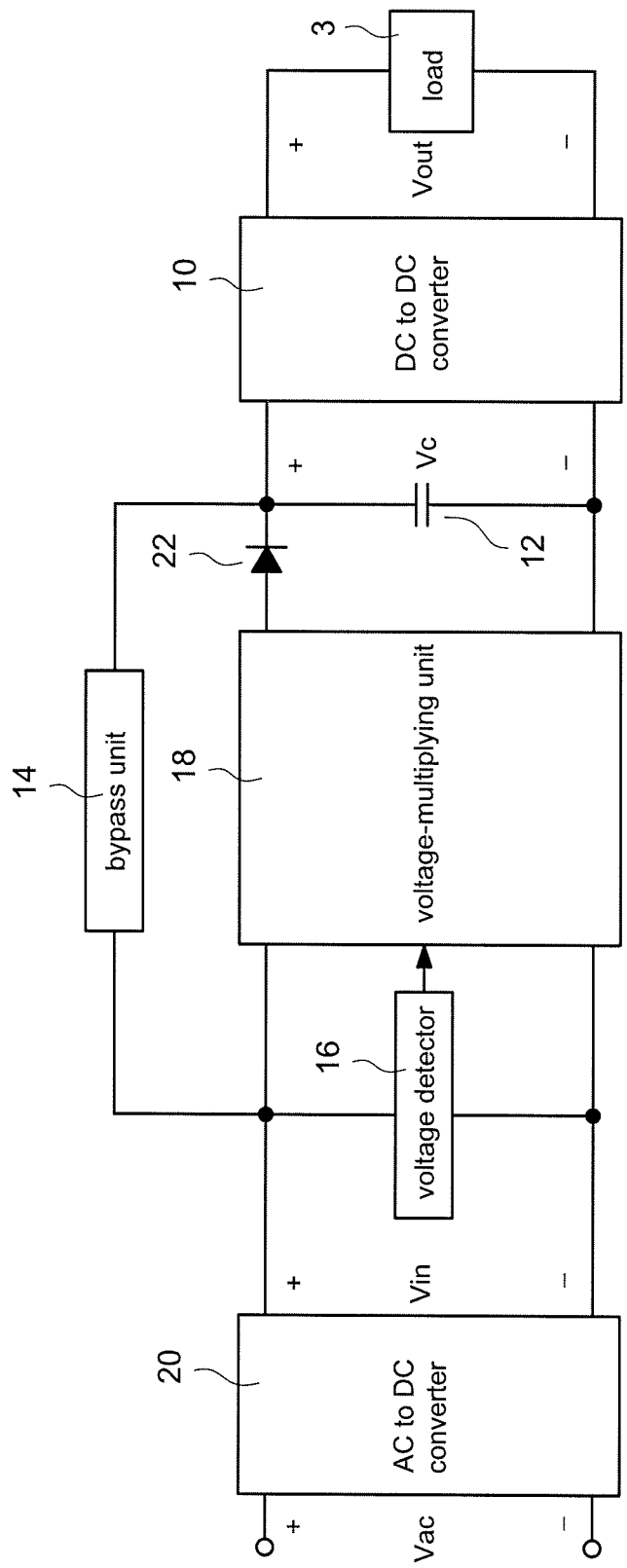
FIG. 1 is a circuit block diagram of a power supply according to a 1st embodiment of the present disclosure.

Reference is made to FIG. 1, which is a circuit block diagram of a power supply according to the 1st embodiment of the present disclosure. The power supply (its reference numeral is omitted) receives an input voltage Vin and generates an output voltage Vout for powering a load 3. In FIG. 1, the power supply includes a direct current (DC) to DC converter 10, a storage capacitor (or called the bulk capacitor) 12, a bypass unit 14, a voltage detector 16, and a voltage-multiplying unit 18.

The power supply may be capable of operating in both an alternating current (AC) domain and a DC domain. The power supply further includes an AC to DC converter 20 for providing the input voltage Vin (with a DC form) when it is applied to the AC domain. Specifically, the AC to DC converter 20 is electrically connected to an AC power source Vac and configured to convert an AC electricity supplied by the AC power source Vac into the input voltage V1 with the DC form. The AC to DC converter 20 is, for example, a bridge rectifier (constituted by diodes) shown in FIG. 2.

The bypass unit 14, the voltage detector 16, and the voltage-multiplying unit 18 are electrically connected to the AC to DC converter 20. The storage capacitor 12 is electrically connected to the bypass unit 14 and the voltage-multiplying unit 18 and has a capacitor voltage Vc.

The DC to DC converter 10 is electrically connected to the storage capacitor 12, it receives the capacitor voltage Vc supplied from the storage capacitor 12 and regulates the capacitor voltage Vc for providing the output voltage Vout fitting requirement of the load 3. The DC to DC converter 10 may operate in a mode selected from a boost mode and a buck mode; an isolated circuit or a non-isolated circuit, such as resonant circuit or pulse-width-modulating circuit, may be used to implement the DC to DC converter 10.

With referring again to FIG. 2; the bypass unit 14 includes a diode 140, a power switch 142, and a power switch controller 144. The anode of the diode 140 is electrically connected to the AC to DC converter 20, and the cathode thereof is electrically connected to the DC to DC converter 10 and the storage capacitor 12. The diode 140 conducts while the input voltage Vin is equal to or greater than the capacitor voltage Vc; on the contrary, the diode 140 cuts off while the input voltage Vin is lower than the capacitor voltage Vc.

The power switch 142 is electrically connected to the diode 140 in parallel; the power switch 142 turns on or off in accordance with a driving signal provided by the power switch controller 144. More particularly, one terminal of the power switch controller 144 is electrically connected to the AC to DC converter 20 for receiving the input voltage Vin, and the other terminal thereof is electrically connected to the storage capacitor 12 for receiving the capacitor voltage Vc. The power switch controller 14 may drive the power switch 142 to turn on while the input voltage Vin is equal to or greater than the capacitor voltage Vc, as a result, the input voltage Vin can be transmitted to the storage capacitor 12 through the power switch 142 for charging the storage capacitor 12 and a function of lowing an impedance conducting the input voltage Vin to the storage capacitor 12 is provided. The power switch controller 144 may further drive the power switch 142 to turn off while the input voltage Vin is lower than the capacitor voltage Vc, so as to prevent the capacitor voltage Vc provided from the storage capacitor 12 to feed back to the AC to DC converter 20.

The voltage detector 16 is electrically connected to the AC to DC converter 20; the voltage detector 16 is configured to detect the input voltage Vin and send a detecting result to the voltage-multiplying unit 18.

The voltage-multiplying unit 18 is electrically connected to the storage capacitor 12, the voltage detector 16, and the AC to DC converter 20, and performs a voltage-multiplying function when the input voltage Vin is lower than a threshold voltage, so that the DC to DC converter 10 can continually provide the output voltage Vout for powering the load 3 within a specific period (after a drop-out or abnormal operation of the AC electricity). In the embodiment, the threshold voltage is a minimum voltage for maintaining the DC to DC converter 10 to successfully provide the output voltage Vout to the load 3.

The power supply may further include a protective switch 22 arranged between the voltage-multiplying unit 18 and the storage capacitor 12 and electrically connected thereto. The protective switch 22 is utilized to prevent the capacitor voltage Vc provided from the storage capacitor 12 to feed back to the voltage-multiplying unit 18. In the embodiment, the protective switch 22 is a diode, the anode of the protective switch 22 is electrically connected to the voltage-multiplying unit 18 and cathode thereof is electrically connected to the storage capacitor 12.

Figure 2:
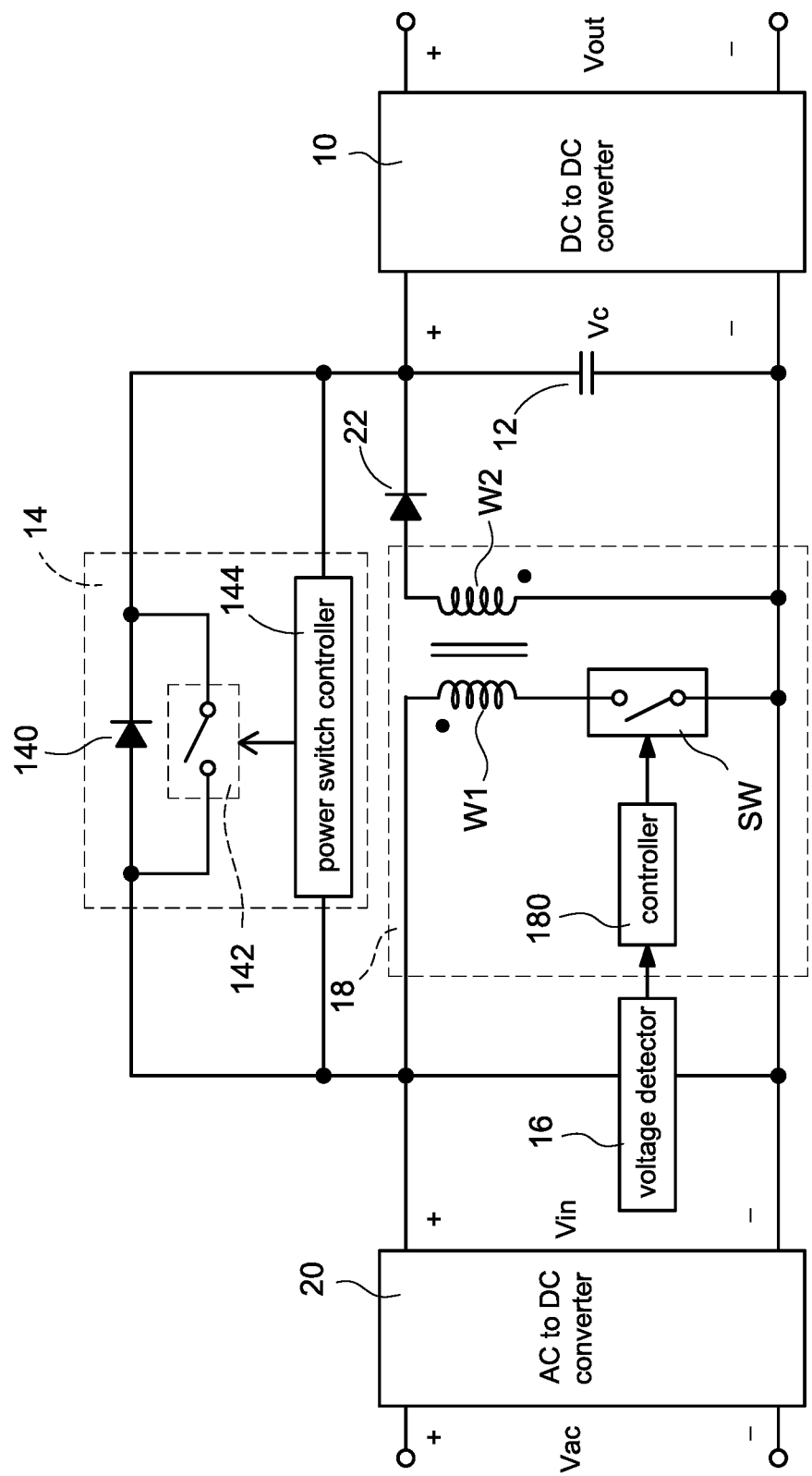
FIG. 2 is a circuit diagram of the power supply according to the 1st embodiment of the present disclosure.

The voltage-multiplying unit 18 may include a first winding W1 and a second winding W2; in FIG. 2, the first winding W1 and the second winding W2 are isolated from each other and collectively constitute an isolation transformer. The first winding W1 is electrically connected to the AC to DC converter 20, and the second winding W2 is electrically connected to the DC to DC converter 10. More particular, one terminal of the second winding W2 is electrically connected to the storage capacitor 12 through the protective switch 22, and the other terminal thereof is grounded. When a turns of the first winding W1 is N1, and a turns of the second winding W2 is N2, the following condition is satisfied:

$$N2/N1>1.$$

The voltage-multiplying unit 18 further includes a controller 180 and a switching element SW; the controller 180 is electrically connected to the voltage detector 16 and the switching element SW and presets the threshold voltage. One terminal of the first winding W1 is electrically connected to the AC to DC converter 20, and the other terminal thereof is grounded through the switching element SW.

The controller 180 receives the detecting result sent from the voltage detector 16 and outputs a controlling signal to the switching element SW when the input voltage Vin is lower than the threshold voltage, so that the first winding W1 is magnetically coupled to the second winding W2 to form the transformer for electricity transmission and charging the storage capacitor 12 to ensure that the capacitor voltage Vc provides from the storage capacitor 12 is sufficient for the DC to DC converter 10 to generate the output voltage for the specific period. In the embodiment, the controlling signal may be a pulse-width-modulating (PWM) signal. When the turns of the first winding W1 is N1, the turns of the second winding W2 is N2, a voltage across the first winding W1 is V1, a voltage across the second winding W2 is V2, and a duty cycle of the PWM signal is D, the following condition is satisfied:

$$V2=D/(1-D) \cdot N2/N1 \cdot V1.$$

With reference to both FIG. 1 and FIG. 2; the diode 140 should conduct and the power switch controller 144 should drive the power switch 142 to turn on when the AC power source Vac supplies the AC electricity stably and the input voltage Vin supplied from the AC to DC converter 20 is equal to or greater than the capacitor voltage Vc, as a result, the input voltage Vin is conducted to the storage capacitor 12 for charging the storage capacitor 12, and the DC to DC converter 10 provides the output voltage Vout to the load 3 for powering the load 3.

The diode 140 cuts off and the power switch controller 144 drives the power switch 142 to turn off when the input voltage Vin supplied from the AC to DC converter 20 is lower than the capacitor voltage Vc since the AC power source Vac is abnormal or dropped-out.

The controller 180 thereafter outputs the controlling signal to the switching element SW when the input voltage Vin is lower than the threshold voltage, such that the voltage-multiplying function is performed by electromagnetically coupling the first winding W1 to the second winding W2 to ensure that the DC to DC converter 10 can continually supply the output voltage Vout for powering the load 3 within the specific period (after the drop-out or abnormal operation of the AC electricity).

Figure 3:
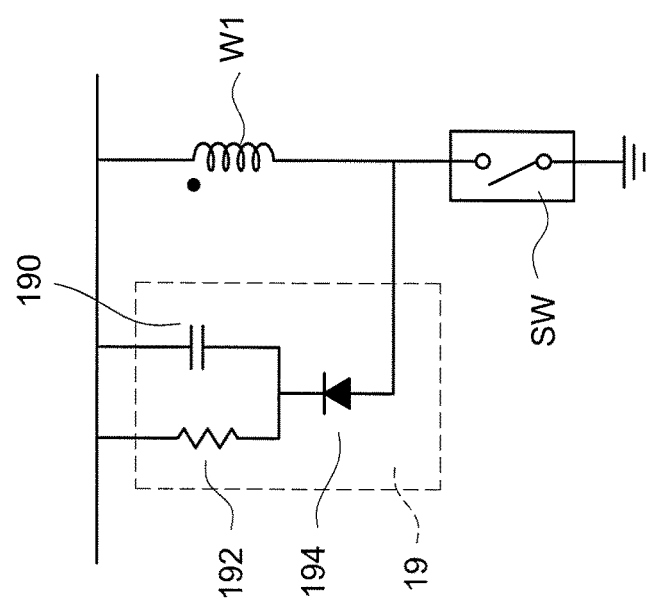
FIG. 3 is a circuit diagram of a buffering circuit according to the 1st embodiment of the present disclosure.

The power supply may further include a buffering circuit 19 as shown in FIG. 3. The buffering circuit 19 is electrically connected to the first winding W1 in parallel and includes a capacitor 190, a resistor 192, and a diode 194; the capacitor 190 is electrically connected to one of the terminals of the first winding W1, and the diode 194 is electrically in serial connected between the other terminal of the first winding W1 and the capacitor 190. The resistor 192 is electrically connected to the capacitor 190 in parallel. The buffering circuit 190 is configured to suppress the peak of surge voltage caused by instantly turning on the switching element SW to prevent the switch element SW from damage.

Figure 4:
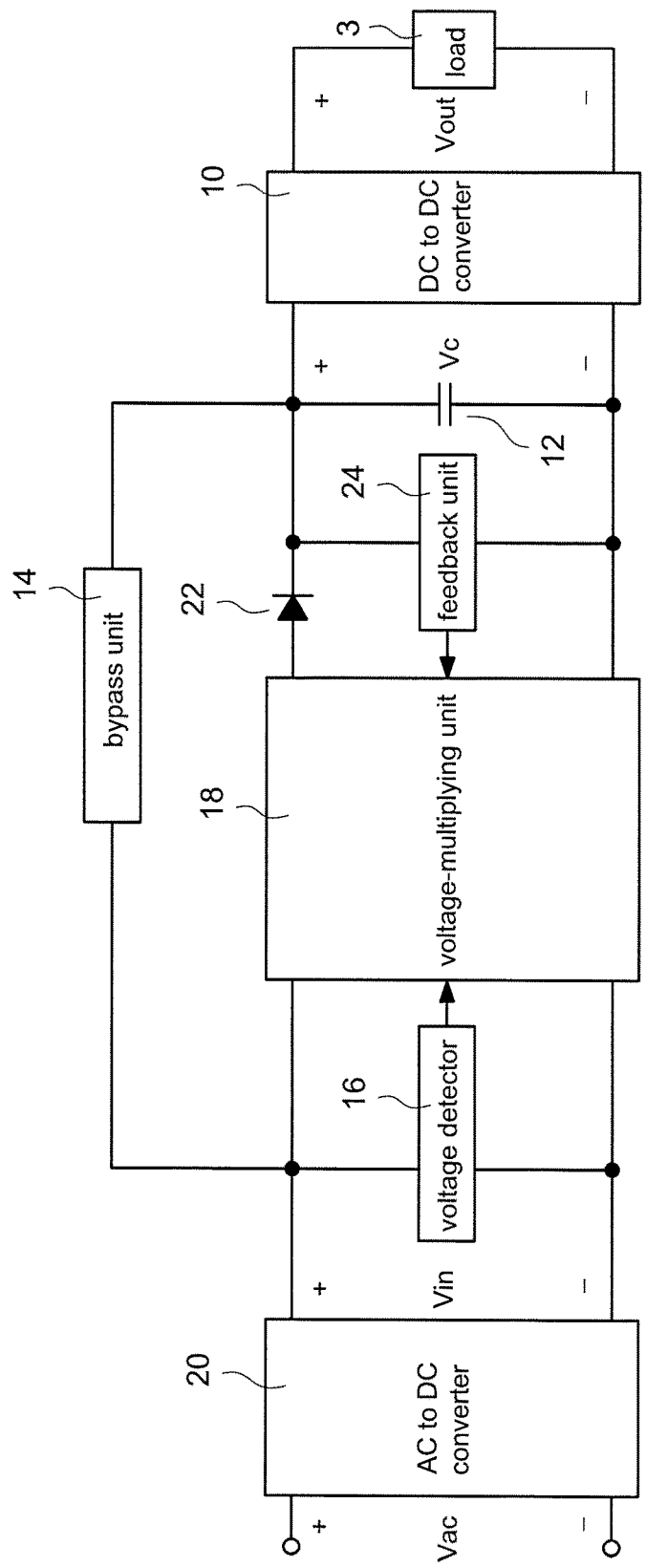
FIG. 4 is a circuit block diagram of a power supply according to a 2nd embodiment of the present disclosure.
Figure 5:
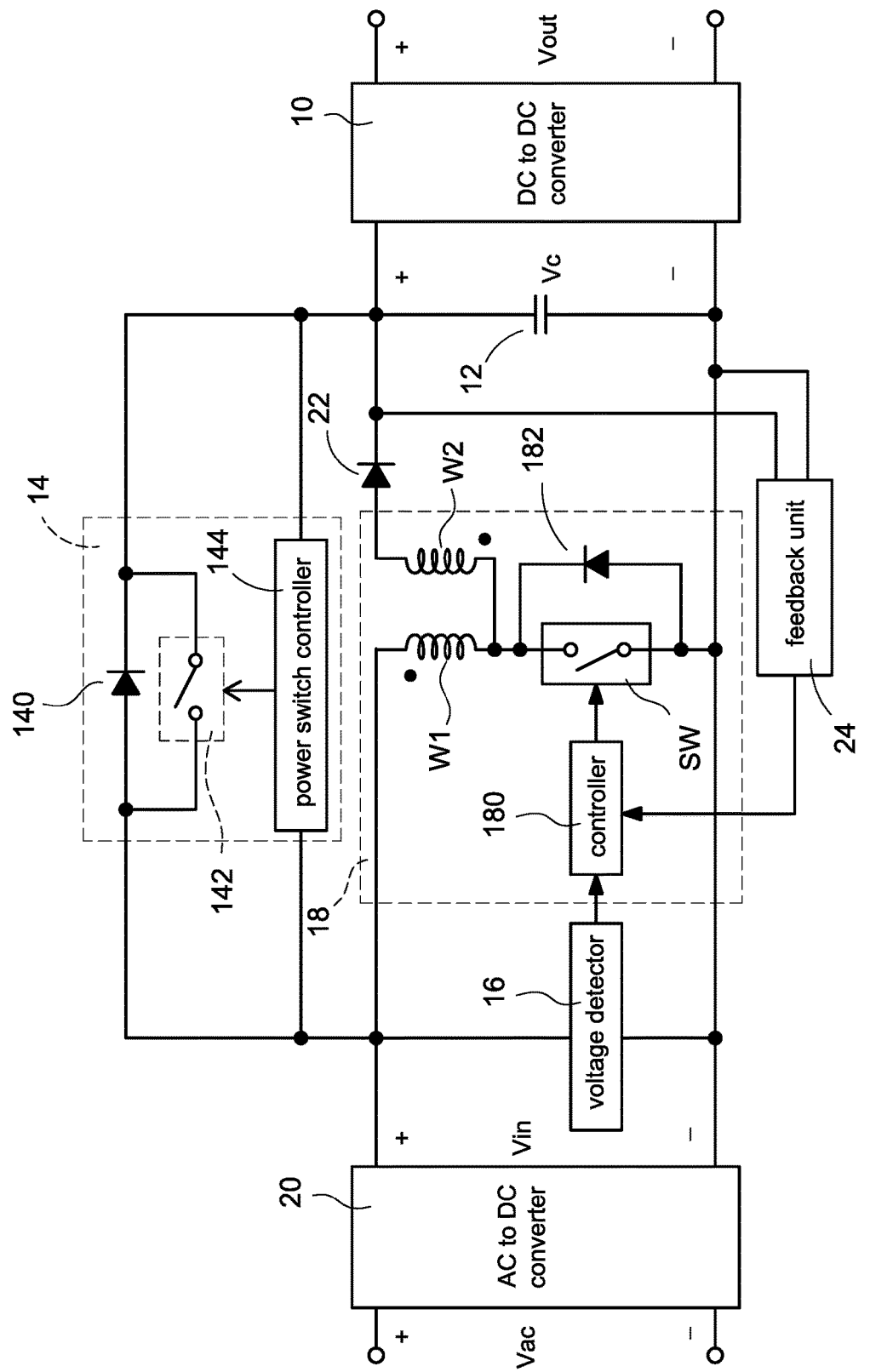
FIG. 5 is a circuit diagram of a power supply according to the 2nd embodiment of the present disclosure.

FIG. 4 is a circuit block diagram of a power supply according to a 2nd embodiment of the present disclosure, and FIG. 5 is a circuit diagram of a power supply according to the 2nd embodiment of the present disclosure. In FIG. 4 and FIG. 5, the power supply (its reference numeral is omitted) includes a DC to DC converter 10, a storage capacitor 12, a bypass unit 14, a voltage detector 16, a voltage-multiplying unit 18, and a feedback unit 24.

The power supply may be capable of operating in both the AC domain and the DC domain. The power supply further includes an AC to DC converter 20 for providing the input voltage Vin (with the DC form) when it is applied to the AC domain. The AC to DC converter 20 may be a bridge rectifier and electrically connected to an AC power source Vac and configured to convert an AC electricity supplied by the AC power source Vac into the input voltage V1 with the DC form.

The bypass unit 14, the voltage detector 16, and the voltage-multiplying unit 18 are electrically connected to the AC to DC converter 20, and the storage capacitor 12 is electrically connected to the bypass unit 14 and the voltage-multiplying unit 18. The storage capacitor 12 has a capacitor voltage Vc.

The DC to DC converter 10 is electrically connected to the storage capacitor 12 for receiving the capacitor voltage Vc supplied from the storage capacitor 12; the DC to DC converter 10 is configured to regulate the capacitor voltage Vc and then provides the output voltage Vout fitting requirement of the load 3 for powering the load 3.

The bypass unit 14 includes a diode 140, a power switch 142, and a power switch controller 144. The anode of the diode 140 is electrically connected to the AC to DC converter 20, and the cathode thereof is electrically connected to the DC to DC converter 10. The power switch 142 is electrically connected to the power switch controller 144 for receiving a driving signal generated by the power switch controller 144. The driving signal is used for turning on or off the power switch 142.

One terminal of the power switch controller 144 is electrically connected to the AC to DC converter 20 for receiving the input voltage Vin supplied therefrom, and the other terminal thereof is electrically connected to the storage capacitor 12 for receiving the capacitor voltage Vc provided therefrom. The power switch controller 144 is configured to turn on or off the power switch 142 in accordance with the input voltage Vin and the capacitor voltage Vc, which are described below.

The voltage-multiplying unit 18 is electrically connected to the AC to DC converter 20, the storage capacitor 12, and the voltage detector 16 includes a controller 180, a switching element SW, a first winding W1, a second winding W2, and a discharging switch 182. In detail, one terminal of the first winding W1 is electrically connected to the AC to DC converter 20, and the other terminal thereof is grounded through the switch element SW; one terminal of the second winding W2 is electrically connected to the storage capacitor 12 through a protective switch 22, and the other terminal thereof is grounded through the switching element SW. The discharging switch 182 is disposed across the switching element SW. When a turns of the first winding W1 is N1, and a turns of the second winding W2 is N2, the following condition is satisfied:

$$N2/N1 > 1.$$

The controller 180 is electrically connected to the voltage detector 16, the switching element SW, and the feedback unit 24; the voltage detector 16 is disposed across (output terminals of) the AC to DC converter 20 and configured to detect the input voltage Vin and send a detecting result of the input voltage Vin to the controller 180, and the feedback unit 24 is disposed across the storage capacitor 12 and configured to detect the capacitor voltage Vc and feedback another detecting result of the capacitor voltage Vc to the controller 180. The controller 180 receives the detecting results provided by the voltage detector 16 and the feedback unit 24 and outputs a controlling signal to switch element SW when the input voltage Vin is lower than the capacitor voltage Vc, such that a voltage-multiplying procedure is performed for charging the storage capacitor 12 by coupling the first winding W1 to the second winding W2 to ensure that the DC to DC converter 10 can continually supply the output voltage Vout to the load 3 within the specific period (after the drop-out or abnormal operation of the AC electricity).

When the turns of the first winding W1 is N1, the turns of the second winding W2 is N2, a voltage across the first winding W1 is V1, a voltage across the second winding W2 is V2, and a duty cycle of the PWM signal is D, the following condition is satisfied:

$$V2 = D/(1-D) - (N1+N2)/N1 * V1.$$

The discharging switch 182 conducts and a discharging route is provided while the switching element SW is cut off; one the contrary, the discharging switch 182 cuts off while the switching element SW is conducted. The discharging switch 182 may be a diode, the cathode of the discharging switch 182 is electrically connected to one terminal of the switching element SW where the first winding W1 and the second winding W2 are connected, and the anode thereof is grounded.

In operation, the diode 140 should conduct and the power switch controller 144 drive the power switch 142 to turn on when the AC power source Vac supplies the AC electricity stably and the input voltage Vin supplied from the AC to DC converter 20 is equal to or greater than the capacitor voltage Vc, so that the input voltage Vin is conducted to the storage capacitor 12 for charging the storage capacitor 12. The protective switch 22 cuts off when the input voltage Vin is equal to or greater than the capacitor voltage Vc for preventing the capacitor voltage Vc provided from the storage capacitor 12 to feed back to the voltage-multiplying unit 18.

The diode 140 cuts off and the power switch controller 144 drives the power switch 142 to turn off when the input voltage Vin supplied from the AC to DC converter 20 is lower than the capacitor voltage Vc since the AC power source Vac is abnormal or dropped-out to prevent the capacitor voltage Vc to feed back to the AC to DC converter 20.

Meanwhile, the controller 180 also outputs the controlling signal to the switching element SW, such that the voltage-multiplying function is performed by coupling the input voltage Vin conducted to the first winding W1 to the second winding W2 for charging the storage capacitor 12. As a result, the DC to DC converter 10 can continually supply the output voltage Vout for powering the load 3 within the specific period (after the drop-out or abnormal operation of the AC electricity).

In the embodiment, the controller 180 determines whether the voltage-multiplying function is performed or not in accordance with the capacitor voltage Vc and the input voltage Vin, thereby reducing a problem of inaccurate determination causing by component error.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A power supply, receiving an input voltage and providing an output voltage to a load, the power supply comprising: a storage capacitor having a capacitor voltage; a direct current (DC) to DC converter receiving the capacitor voltage, wherein the DC to DC converter is configured to convert the capacitor voltage into the output voltage; a voltage detector configured to detect the input voltage; a bypass unit, comprising: a diode electrically connected to the storage capacitor, wherein the diode receives the input voltage and cuts off while the input voltage is lower than the capacitor voltage; and a power switch electrically connected to the diode in parallel, wherein the power switch is turned on while the input voltage is equal to or greater than the capacitor voltage for conducting the input voltage to the storage capacitor and is turned off while the input voltage is lower than the capacitor voltage; and a voltage-multiplying unit electrically connected to the storage capacitor and the voltage detector and comprising: a first winding; a second winding, wherein a turn ratio of the second winding to the first winding is greater than one; a switching element electrically connected to the first winding; and a controller electrically connected to the voltage detector and the switching element, wherein the voltage-multiplying unit is activated and the controller outputs a controlling signal to the switching element for performing a voltage-multiplying procedure by coupling the input voltage conducted to the first winding to the second winding for charging the storage capacitor when the input voltage is lower than a threshold voltage to ensure that the DC to DC converter successfully generates the output voltage for a specific period.

2. The power supply in claim 1, further comprising a feedback unit electrically connected to the storage capacitor and the controller for feedbacking a detecting result of the capacitor voltage to the controller, wherein the threshold voltage is the capacitor voltage.

3. The power supply in claim 1, further comprising a buffering circuit, comprising:
   a capacitor electrically connected to one terminal of the first winding;
   a diode serially connected between the other terminal of the first winding and the capacitor; and
   a resistor electrically connected to the capacitor in parallel.

4. The power supply in claim 1, wherein the first winding and the second winding separated from each other collectively constitute an isolated transformer, the first winding receives the input voltage and the second winding is electrically connected to the DC to DC converter.

5. The power supply in claim 1, wherein one terminal of the first winding receives the input voltage and the other terminal of the first winding is electrically connected to the second winding and the switching element, the voltage-multiplying unit further comprises a discharging switch disposed across the switching element, and the discharging switch turns on when the switching element is turned off.

6. The power supply in claim 1, wherein the bypass unit further comprising a power switch controller electrically connected the power switch, the power switch controller drives the power switch to turn on when the input voltage is equal to or greater than the capacitor voltage, and the power switch controller further drives the power switch to turn off when the input voltage is lower than the capacitor voltage.

7. The power supply in claim 1, further comprising a protective switch electrically connected between the second winding and the storage capacitor to prevent the capacitor voltage from feeding back to the voltage-multiplying unit.

* * * * *